:::::::::::::::: {.columns}
::: {.column}
(12) United States Patent
Wagner et al.

(54) HANDLEBAR STEM AND HANDLEBAR STEM SYSTEM

(71) Applicant: Canyon Bicycles GmbH, Koblenz (DE)

(72) Inventors: Lars Wagner, Muehltal (DE); Matej Sömen, Koblenz (DE)

(73) Assignee: Canyon Bicycles GmbH, Koblenz (DE)

( * ) Notice: Subject to any disclaimer, the term of this patent is extended or adjusted under 35 U.S.C. 154(b) by 29 days.

(21) Appl. No.: 16/867,687

(22) Filed: May 6, 2020

(65) Prior Publication Data

US 2020/0354011 A1  Nov. 12, 2020

(30) Foreign Application Priority Data

May 7, 2019  (DE) .................... 20 2019 102 546.8

(51) Int. Cl.
*B62K 21/12*  (2006.01)
*B62K 21/18*  (2006.01)

(52) U.S. Cl.
CPC .............. *B62K 21/12* (2013.01); *B62K 21/18* (2013.01)
:::
::: {.column}

(10) Patent No.: US 11,260,932 B2
(45) Date of Patent: Mar. 1, 2022

(58) Field of Classification Search
CPC ...... B62K 21/14; B62K 21/145; B62K 21/18; B62K 21/20; B62K 21/12
See application file for complete search history.

(56) References Cited

U.S. PATENT DOCUMENTS

| 608,021 | A |   | 7/1898 | Bille |
|---|---|---|---|---|
| 2,233,313 | A | * | 2/1941 | Hazelroth ............ B62K 21/20 280/276 |
| 2,294,839 | A |   | 9/1942 | Duffy |
| 2,523,402 | A |   | 9/1950 | Townsend |
| 5,279,181 | A | * | 1/1994 | Boudreau ............ B62K 21/18 280/279 |

FOREIGN PATENT DOCUMENTS

| CH | 99180 A | * | 5/1923 | ............ B62K 25/16 |
|---|---|---|---|---|
| DE | 29715537 U1 |   | 12/1997 |   |
| DE | 102010026504 A1 |   | 1/2012 |   |
| DE | 202014004397 U1 |   | 8/2014 |   |
| EP | 3246236 A1 |   | 11/2017 |   |

* cited by examiner

*Primary Examiner* — Thomas C Diaz
(74) *Attorney, Agent, or Firm* — The Webb Law Firm

(57) ABSTRACT

A handlebar stem, in particular for racing bicycle handlebars, comprises a main element which is connected to a handlebar at a front end. The main element is connected to the handlebar stem tube in the area of a rear end. The handlebar stem tube is connectible to a steerer tube such that it is bendable in the longitudinal direction to improve riding comfort.

10 Claims, 1 Drawing Sheet
:::
::::::::::::::::

HANDLEBAR STEM AND HANDLEBAR STEM SYSTEM

CROSS-REFERENCE TO RELATED APPLICATION

This application claims priority to German Utility Model Application No. 20 2019 102 546.8 filed May 7, 2019, the disclosure of which is hereby incorporated by reference in its entirety.

BACKGROUND OF THE INVENTION

Field of the Invention

The invention relates to a handlebar stem for a bicycle handlebar, in particular for a racing bicycle handlebar. The invention further relates to a handlebar stem system for a racing bicycle handlebar comprising a handlebar stem according to the invention.

Description of the Related Art

The stem of the handlebar is connected on the one hand to a steerer tube and on the other hand to the bicycle handlebar. The connection to the handlebar, in particular for modern racing bicycle handlebars, can also be formed integrally. Furthermore, a connection via a clamping mechanism is common. The connection of the stem to the steerer tube is usually effected via a clamping connection. In this regard, the steerer tube is connected to the front wheel fork or formed integrally therewith, respectively, wherein the front wheel fork particularly comprises two fork legs being connected to each other via a fork bridge, wherein the fork bridge is then connected to the steerer tube or particularly formed integrally therewith, respectively.

In order to improve the riding comfort, it is known for tracking bicycles and mountain bikes, for example, to provide spring-loaded front wheel forks. However, said front wheel forks are not utilized for racing bicycles due to their high weight and low torsional stiffness. In order to improve riding comfort, it is known for unsprung forks, which are particularly used for racing bicycles, to design the fork legs of the front wheel fork more flexibly. However, only slight improvements could be achieved since increasing the flexibility of the fork legs has a negative effect on the stiffness of the fork and thus on the riding.

SUMMARY OF THE INVENTION

An object of the invention is to create a handlebar stem, in particular for racing bicycle handlebars, with which the riding comfort can be improved. It is further an object of the invention to create a corresponding handlebar stem system comprising such a handlebar stem.

The handlebar stem according to the invention, which is particularly suitable for racing bicycles and by which the comfort can be improved for racing bicycle handlebars, comprises a main element having a handlebar mount at a front end for connection to a handlebar. The front end is the end of the main element that faces in the direction of travel when the handlebar stem is mounted and is connected to the handlebar. The connection to the handle can be effected via a clamping mechanism, a clamping element or the like. It is further possible that the main element of the handlebar stem in integrally connected to the handlebar.

In addition, the main element of the handlebar stem according to the invention is connected at a rear end opposite the front end to the handlebar stem tube. The connection to the handlebar stem tube can be effected via a holding or a clamping element, wherein it is also possible that the handlebar stem is integrally formed to the main element. The handlebar stem tube serves for connection to a bicycle fork, in particular to a steerer tube of the bicycle fork.

According to the invention, the handlebar stem tube comprises a non-circular cross-section. Thus, flexing and bending the handlebar stem tube is possible, in particular relative to the steerer tube. For such a flexibility, for example impacts introduced to the bicycle fork by unevenness in the road surface can be absorbed and are only transmitted to a smaller extent to the bicycle handlebar and thus to the cyclist's wrists. Thus, the riding comfort is significantly improved, in particular when connecting the handlebar stem according to the invention to an unsprung bicycle fork as usually provided for racing bicycles.

In a preferred embodiment of the invention, the handlebar stem tube has a smaller dimension in the longitudinal direction of the main element, that is in the mounted state in the direction of travel, than transverse to the longitudinal direction. In particular, the cross-section of the handlebar stem tube is of transverse oval shape. Such a wide handlebar stem tube in relation to the longitudinal direction has the advantage that a bending or flexing in the longitudinal direction is possible, wherein a higher stiffness is realized transverse to the longitudinal direction. This can significantly improve riding comfort and, in particular, absorb impacts well.

Furthermore, the invention relates to a handlebar stem system which is particularly provided for racing bicycle handlebars. The handlebar stem system comprises a front wheel fork having two fork legs being connected to each other via a fork bridge and a steerer tube connected to the fork bridge. The fork legs can be integrally formed with the fork bridge. It is also possible that the fork bridge is integrally formed with the steerer tube. The handlebar stem system according to the invention further comprises a handlebar stem as described above and in particular preferably further developed. For connection of the steerer tube to the handlebar stem tube, the steerer tube comprises a receiving opening or a recess, respectively, for receiving the handlebar stem tube. The handlebar stem tube can thus be inserted into the recess or the opening of the steerer tube, respectively. It is preferred that the handlebar stem tube is not completely inserted into the receiving opening of the steerer tube but protrudes therefrom. Thus, it is possible on the one hand to realize a firm connection between the steerer tube and the handlebar stem tube and on the other hand to bend or flex the protruding part of the handlebar stem tube in the mounted state, respectively.

Preferably, a fixing means for connection of the handlebar stem tube to the steerer tube is provided. The fixing means can be a clamping means by means of which the handlebar stem tube is clampingly fixed in the receiving opening. The connection can also be effected by a screw connection or the like. Providing a clamping connection has the advantage that it is possible to design the clamping connection such that a gradual clamping is possible. In this respect, the extent to which the handlebar stem tube protrudes with respect to the steerer tube can be selected continuously. This can be used on the one hand for adjusting the flexing properties and also for adjusting the handlebar height.

Preferably, a clamping element for holding the flexing means is arranged between the handlebar stem tube and the steerer tube. Said clamping element comprises a clamping means in the form of a screw and a clamping part, for example. The clamping part is fixed by the screw and effects a clamping fixing of the handlebar stem tube and the steerer tube. In particular, the clamping means, such as the screw, is accessible from the outside through an opening in the headtube of the bicycle frame.

In a particularly preferred development of the invention, the steerer tube comprises a cavity in an area facing in the direction of the holding element of the handlebar stem. In the mounted state, the handlebar stem tube is arranged in said cavity or penetrates said cavity, respectively, in the longitudinal direction of the steerer shaft. It is particularly preferred that external dimensions of the handlebar stem tube are smaller than the internal dimensions of the cavity. Thus, the handlebar stem tube does not completely fill the cavity. This has the advantage that the handle stem tube can be moved or bend, respectively, into the cavity, in particular in the longitudinal direction of the main element of the handlebar stem or in the direction of travel, respectively. The flexing of the handlebar stem tube is thus effected substantially within the cavity of the steerer tube.

It is preferred that at least one of a front side and a rear side of the handlebar stem tube comprises a distance to the respective inner side, that is in the direction of travel to the front or rear inner side of the steerer tube. Traverse to the direction of travel the handlebar stem tube also has smaller dimension than the interior of the cavity of the steerer tube since otherwise a flexing of the handlebar stem tube would only be possible in a small angular range. Preferably, the handlebar stem tube can be displaceably fixed in the recess, that is the opening of the steerer tube, in different positions, in particular in a continuous manner. This has the effect that the handlebar stem tube and thus also the main element of the handlebar stem connected to the handlebar stem tube is arranged at different heights. Thus, preferably at least one spacing element is arranged between a top side of the of the steerer tube and a bottom side of the main element. It is particularly preferred that the at least one spacing element is elastically formed. Preferably, several spacing elements are provided, wherein it is sufficient that only one or only some of the spacing elements are elastically formed. The elastic design of at least one spacing element ensures that the handlebar stem tube can be flexed or bend, respectively, in particular within the cavity of the steerer tube.

BRIEF DESCRIPTION OF THE DRAWINGS

In the following, the invention is described in more detail by means of a preferred embodiment with reference to the attached drawings in which.

DESCRIPTION OF THE INVENTION

Figure 1:
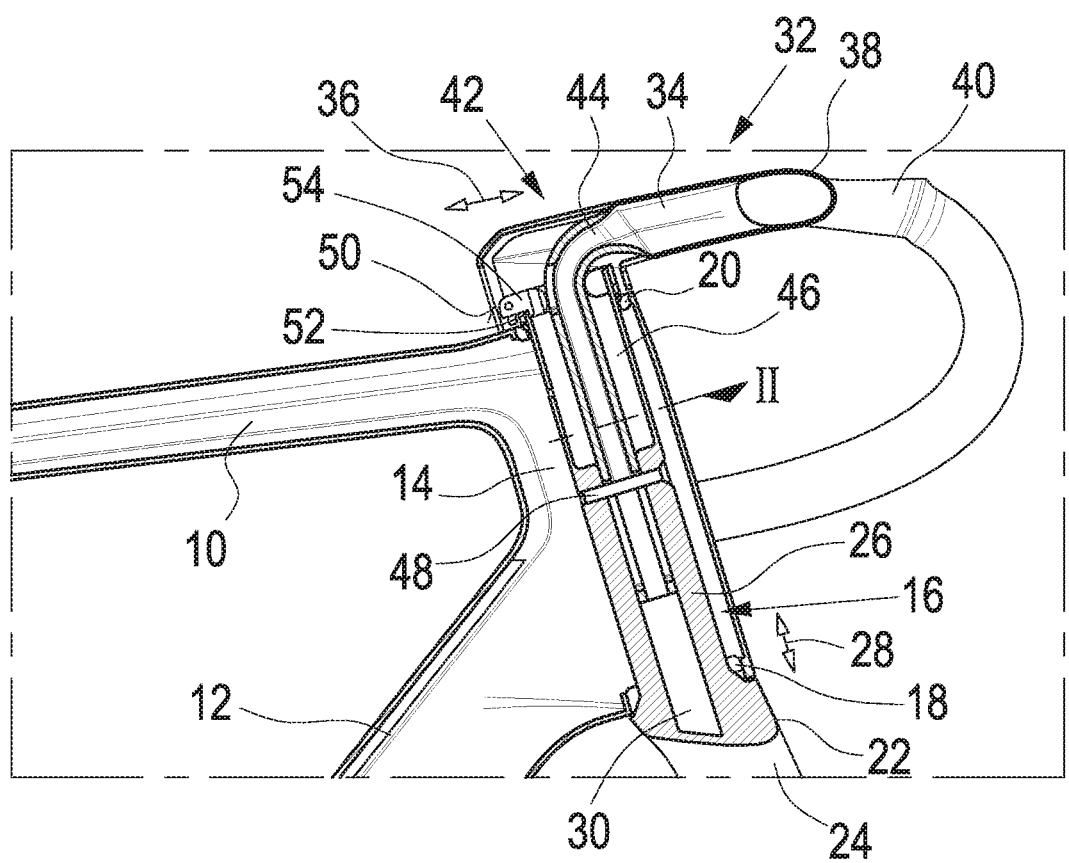
FIG. 1 shows a schematic partially sectioned view of a handlebar stem system, wherein also a portion of the bicycle frame is visible.

The area of the bicycle frame schematically shown in FIG. 1 comprises a top tube 10, a down tube 12 and a headtube 14 being connected to both the top tube 10 and the down tube 12. In the headtube 14, a steerer tube 16 is rotatably arranged via two steering bearings 18, 20. The steerer tube 16 is integrally connected to a fork bridge 22 which is in turn integrally connected to the two fork legs 24, as illustrated in the exemplary embodiment.

Figure 2:
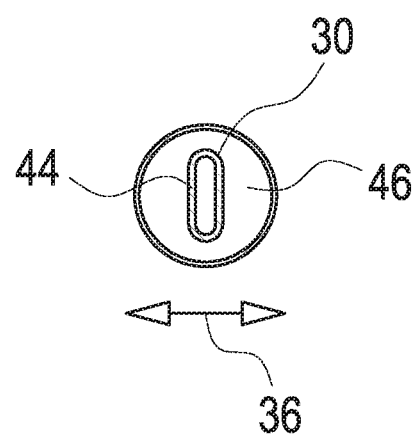
FIG. 2 shows a schematic sectional view of the steerer tube in the area II of FIG. 1.

The steerer tube 16 comprises a lower area 26. In the area 26, a receiving opening 30 extending in the longitudinal direction 28 of the steerer tube is formed. In the illustrated exemplary embodiment, the receiving opening 30 is formed to be of a transverse oval shape (see FIG. 2).

In addition, the handlebar stem system according to the invention comprises a handlebar stem 32. The handlebar stem 32 comprises a main element 34. In the longitudinal direction 36 of the main element 34 or in the direction of travel 36, respectively, the main element 34 comprises a handlebar mount at a front end 38, for example for clampingly fixing a racing bicycle handlebar 40. The racing bicycle handlebar 40 can also be integrally formed with the main element 34.

At the rear end 42 or in the rear area 42 of the main element 34, respectively, the main element 34 is connected to a handlebar stem tube 44, in particular integrally formed therewith. In FIG. 1, the handlebar stem tube 44 is curved in the upper area, that is in the area of the main element, and then extends in the longitudinal direction 28 of the steerer tube 16. The handlebar stem tube 44 is arranged in an upper area of the steerer tube 16 in a cavity 46. In cross-section (FIG. 2), the internal dimensions of the cavity 46 are larger than the external dimension of the handlebar stem tube 44. The handlebar stem tube 44 can thus be bend or flexed, respectively, in the longitudinal direction or the direction of travel 36 within the cavity 46.

A lower end of the handlebar stem tube of FIG. 1, that is in the mounted state, protrudes into the receiving opening 30 of the steerer tube 16. The receiving opening 30 substantially comprises internal dimensions corresponding to the external dimensions of the handlebar stem tube 44, wherein the handlebar tube 44 as well as the receiving opening 30 are of transverse oval shape (see FIG. 2). The fixing of the handlebar stem tube 44 in the receiving opening 30 of the steerer tube 16 is effected via a clamping or a fixing element, such as a screw 48.

Depending on the horizontal arrangement of the handlebar stem tube 44 in the receiving opening 30, there is a distance between the bottom side 50 of the main element 34 and a top side 52 of the steerer tube. Said distance is bridged by a spacing element, a so-called spacer, 54, in order to ensure a clearly defined location. The at least one spacing element 54 is preferably made of an elastic material.

The invention claimed is:

1. A handlebar stem for racing bicycle handlebars, comprising:
   a main element having a handlebar mount at a front end for connection to a handlebar, and
   a handlebar stem tube arranged at a rear end opposite the front end and connectible to a steerer tube of a bicycle fork,
   wherein the handlebar stem tube comprises a non-circular cross-section,
   wherein the cross-section of the handlebar stem tube is of transverse oval shape, and
   wherein the handlebar stem tube has a greater flexibility in a longitudinal direction of the main element than transverse to the longitudinal direction.

2. The handlebar stem of claim 1, wherein the handlebar stem tube has a smaller dimension in a longitudinal direction of the main element than transverse to the longitudinal direction.

3. A handlebar stem system for racing bicycle handlebars, comprising:

a front wheel fork having two fork legs which are connected via a fork bridge, wherein the fork bridge is connected to a steerer tube, a handlebar stem comprising:
   a main element having a handlebar mount at a front end for connection to a handlebar, and
   a handlebar stem tube arranged at a rear end opposite the front end and connectible to the steerer tube,
   wherein the handlebar stem tube comprises a non-circular cross-section, and a receiving opening provided in the steerer tube for receiving the handlebar stem tube, and
   wherein the steerer tube comprises a cavity, which surrounds the handlebar stem tube in an area facing in the direction of the main element of the handlebar stem and allows for flexing of the handlebar stem tube in a longitudinal direction of the main element.

4. The handlebar stem system of claim 3, further comprising a fixing means for connection of the handlebar stem tube to the steerer tube.

5. The handlebar stem system of claim 4, wherein the fixing means clampingly fixes the handlebar stem tube in the receiving opening.

6. The handlebar stem system of claim 4, wherein the fixing means comprises a clamping element which is arranged between the handlebar stem tube and the steerer tube.

7. The handlebar stem system of claim 3, wherein the handlebar stem tube does not completely fill the cavity in a longitudinal direction of the main element.

8. The handlebar stem system of claim 3, wherein in the area of the cavity at least one of a front side and a rear side of the handlebar stem tube comprises a distance to an inner side of the housing tube.

9. The handlebar stem system of claim 3, further comprising at least an annular spacing element is arranged between the bottom side of the main element of the handlebar stem and a top side of the steerer tube.

10. The handlebar stem system of claim 9, wherein the at least an annular spacing element is made of an elastic material.

* * * * *